June 20, 1961

W. A. BISHMAN 2,989,116

TIRE CHANGING TOOL

Filed March 18, 1958

INVENTOR.
WALTER A. BISHMAN
BY Ralph L. Wugger
ATTORNEY

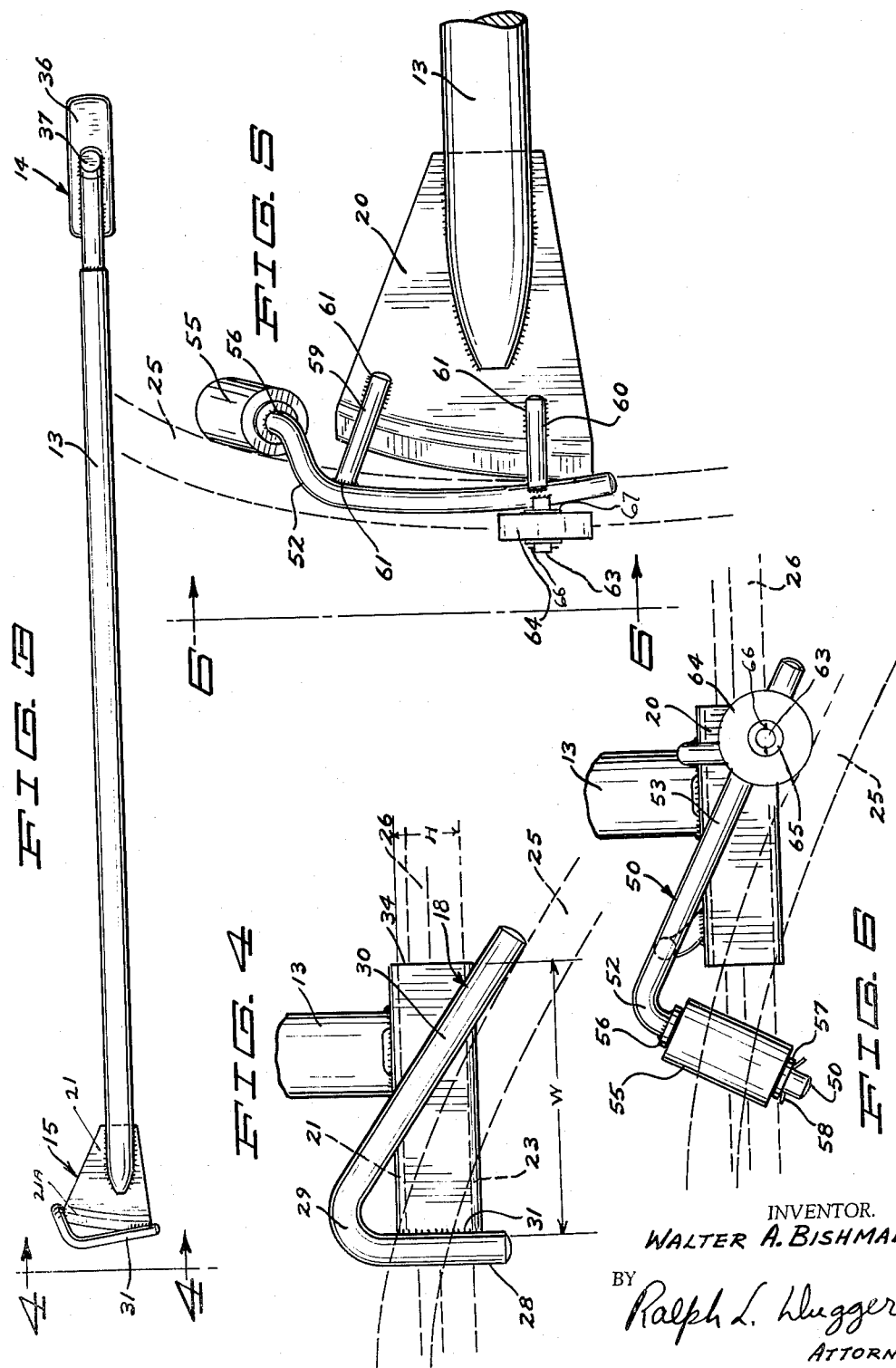

United States Patent Office 2,989,116
Patented June 20, 1961

2,989,116
TIRE CHANGING TOOL
Walter A. Bishman, Osseo, Minn., assignor to Bishman Manufacturing Company, Osseo, Minn., a corporation of Minnesota
Filed Mar. 18, 1958, Ser. No. 722,323
5 Claims. (Cl. 157—1.24)

This invention relates to a device for changing tires, that is, a device for mounting and demounting tires on and off a rim. More particularly, this invention relates to a hand operated tool for mounting the tires on a wheel rim.

Mounting and demounting the tire from a wheel rim normally is an arduous task since the rims are usually of one-piece construction and the bead of the tire is normally of a smaller diameter than the flange of the wheel rim over which said bead has to be mounted. As a result, a large force has to be provided for forcing the bead over the edge of the rim. In normal hand tire changing devices, the bead is first engaged with the "tire tool" for separating the bead from the rim at one point whereat a second "tire tool" is inserted between the space and the rim. Then, while the bead is held or deflected outward from the rim at one point, the second tool is rotated concentrically with respect to the tire-rim assembly and in so doing it moves the bead radially from the rim and at the same time forces the bead over the rim. In such devices, a great force is produced in a radial direction and in the manual operated devices, such forces have to be manually produced.

In using hand tire tools presently available, the following problems are generally encountered, namely, the tools tend to slip out of position and as a result they have to be reinserted; or else the tools tend to rotate in the hands of the user and thereby make it difficult to operate them. Both of these factors, amongst others, such as the large radial force necessary to force the bead over the rim flange contribute toward making the changing of tires a difficult and time consuming operation.

It is an object of this invention to provide a hand operated tire tool that may be readily used to either mount or demount a tire from a wheel rim, said tool having portions to retain the tool in a desired position with respect to said rim while mounting or demounting a tire therefrom.

It is another object of this invention to provide an improved hand operated tire changing tool that is mountable for radially sliding movement on the rim with which it is to be used, but at the same time it is held against displacement in a radial direction by the tire to be mounted on said rim. It is a further object of this invention to provide a tire changing tool which has means for holding the tool in position adjacent the outer periphery of the flange of the rim while at the same time having means connected thereto for forcing the bead of a tire out from said rim and down below the flange of said rim. Additionally, it is an object of this invention to provide a tool for changing tires wherein said tool may be manually rotated about a fixed pivot which acts like a fulcrum and thereby provides sufficient leverage so that the portion of the tool that engages the rim flange and the element connected to said portion that forces the bead of the tire in an outward and a downward direction with respect to the rim flange may be readily rotated around the periphery of the flange to mount a tire.

It is still a further object of this invention to provide an improved hand operated tire changing tool that is rotated about a center axis and has a portion that retains the tool in a radial position with respect to the rim flange while the tool is rotated about said axis. The aforementioned portion has an element connected thereto to transmit an outward and downward force to the bead, said force being taken from the rim.

Still a further object of this invention is to provide a tire changing tool which has appropriate structure on one end thereof for readily demounting a tire from the rim on which it is mounted while at the same time having structure on the opposite end such that it may be used for mounting a tire on a rim. The structure on said opposite end of the tool is to include a retaining means for holding said end in position with respect to the rim while the tool is manually rotated about a fixed pivot point, rotating means which engages the portion of the bead which is above the rim for pushing said bead outward from the rim and a second rotary means on said opposite end for forcing the beads of a tire below the upper surface of said flange, said rotating means being mounted adjacent the opposite transverse ends of the retaining means.

Other and further objects are those inherent in the invention herein illustrated, described in the claims, and will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which the corresponding numerals refer to the same parts and in which:

FIGURE 3 is a top plan view of the tire changing tool of this invention;

FIGURE 4 is an end view of the tire changing tool taken along the line and looking in the direction of the arrows 4—4 to illustrate the means for pushing the bead out from and beneath the flange portion of the rim, the bead and the flange being shown in dotted lines;

FIGURE 5 is a partial top plan view of a modified embodiment of my invention wherein a rotating means is provided for forcing the bead outwardly from the rim and a second rotating means is provided for forcing the bead downwardly beneath the peripheral edge of the flange of the rim;

FIGURE 6 is an end view taken along the line and looking in the direction of the arrows 6—6 to illustrate the relative positions of the rotating means, the bead and the rim flange, said bead and flange being shown in phantom.

Figure 1:
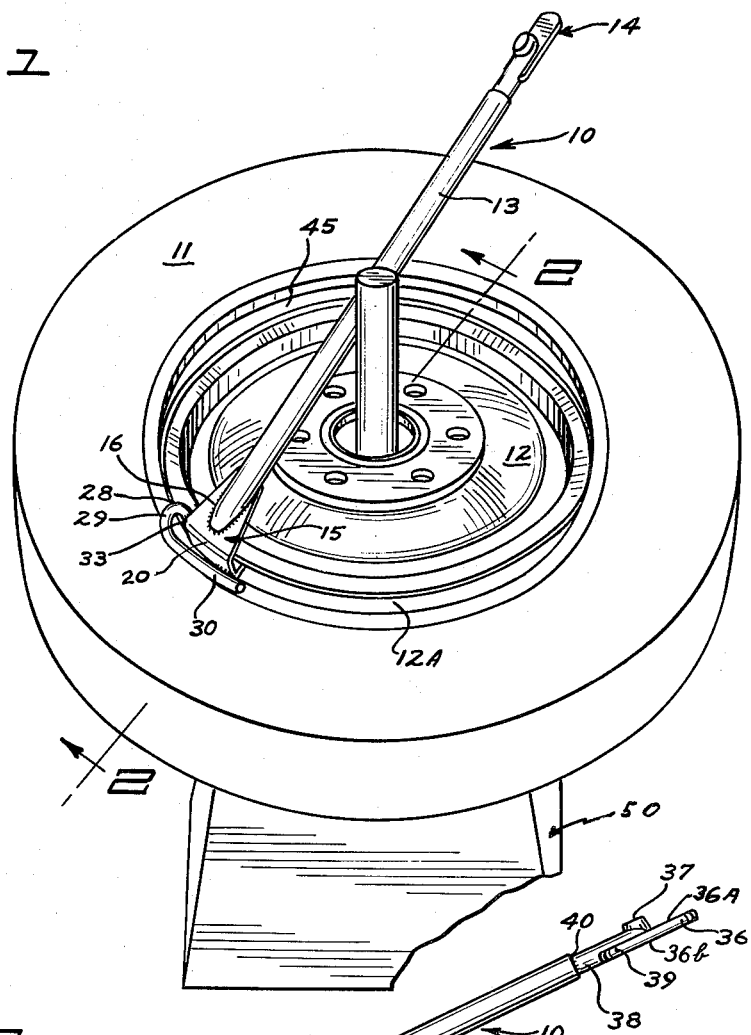
FIGURE 1 is a perspective view of the tire changing tool being used to mount a tire on a rim, said rim being held in position on a base.
Figure 2:
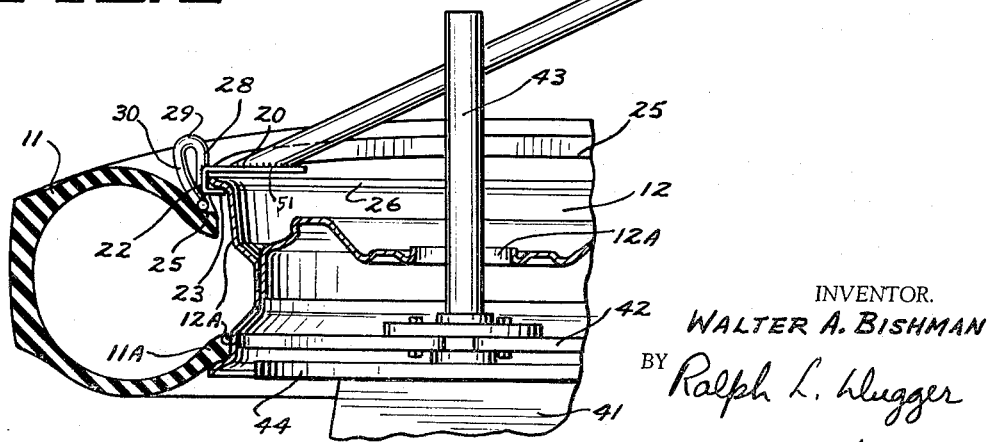
FIGURE 2 is a side cross-sectional view taken along the line and looking in the direction of the arrows 2—2 of FIGURE 1 to illustrate the use of the tire changing tool for forcing the bead out from and down below the surface of the rim flange.

Referring now to the drawings and particularly to FIGURES 1 and 2, there is shown a perspective view and a cross sectional side view of the tire changing tool, generally designated as 10, being used to mount a tire 11 on a wheel rim 12. The tire changing tool is essentially an elongated cylindrical shaft 13 having a demounting end portion 14 integrally connected to one end of said shaft by weld 40 and a mounting end portion 15 secured to the opposite end of said shaft by weld 16.

The mounting end of the shaft is cut at a diagonal 51 to the longitudinal axis of the shaft so as to provide a flat surface to which the flat plate 21 may be welded; and also so that the handle or shaft 13 will extend in an upward direction when the rim engaging head 20 is positioned on the rim to mount a tire. The purpose of the last mentioned factor will be explained hereinafter.

The mounting end portion 15 is made up of a bead engaging bar 18 and a rim engaging head 20. The rim engaging head is made up of a horizontal substantially trapezoidal flat plate 21, a vertical leg 22 formed integral with the major base 21a of the flat plate and extending downwardly therefrom, and an inwardly turned hook 23 formed integral with and connected to the bottom edge portion of the vertical leg. The major base 21a of the flat plate and the vertical leg are curved (have a radius of curvature similar to the rim) such that said portions tend to be adjacent the peripheral edge of the rim flange when the rim engaging head is positioned thereon. The inward edge of the inwardly turned hook also has a radius of curvature similar to the radius of curvature of the rim.

The vertical height of the vertical leg is greater than the transverse width of the rim flange 26. Thus the tool may be used with tires having rim flanges of different widths. The widths W of the vertical leg and correspondingly of the major base of the flat plate and of inwardly turned hook are substantially greater than the height of the vertical leg. As a result of the aforementioned and that the hook and the shaft both extend in the same general direction with reference to the vertical leg when the rim engaging head is positioned in the rim, it comes in contact with a sufficient portion of peripheral edge of the rim so that any coupling movements set up in the tool will bear against the rim and will not operate to rotate the handle 13 in the hands of the operator when it is being used.

The bead engaging bar 18 is made up of three sections; a vertical section 28, a curved section 29, and an inclined section 30. The vertical section which extends radially outward from and in front of the leading edge 33 of the vertical leg (when the rim engaging portion is positioned on the rim) is secured to said leading edge by weld 31. The inclined section 30 is secured to the vertical leg adjacent the trailing edge thereof by weld 31.

In order to facilitate the description of the structural formation of the bead engaging bar, it will be considered that a straight round cylindrical bar is started with and then the bends made thereto will be set forth. First, the bar is bent at right angles to itself to form a lower vertical section 28. Then the bar is reversely bent such that it will be perpendicular to a plane passing through the legs or portions forming the original right angle bend, thus forming the curved section 29. The bar is then bent in a downward direction with respect to the aforementioned plane to form the inclined section 30, said inclined section forming approximately a 50° angle with said plane. As may be noted in FIGURE 4, the length of the bar is chosen such that the lower portion of the vertical section extends downwardly below a horizontal plane passed through the surface of the inwardly turned hook and that the upper end of said vertical section extends above the level of a horizontal plane passed through the flat plate 21. The lower end of the inclined section extends outwardly beyond and downwardly below the trailing edge 34 of the vertical leg.

The mounting end portion having been described, the demounting end portion 14 will now be described. The demounting portion is primarily made up of a rectangular plate 36, a rod 38, and a knob 37. The shaft 38 has an elongated slot 39 cut out of one end thereof such that when a portion of the upper surface and the end surface of the rectangular plate abuts the slotted portion of the rod, the lower surface of the plate is substantially in the same plane as the outer peripheral edge of said rod when the plate is mounted on said shaft. The rectangular plate is secured in the slotted portion by welding it thereon.

The knob 37 is formed on the rod on the side diametrically opposite the slotted portion and on the same end of said shaft. The opposite end of the shaft is welded to the shaft 13 by a weld 40 such that the longitudinal axis of the rod coincides with the longitudinal axis of the cylindrical shaft.

The description of the structure of the tire changing tool having been set forth, the operations using a tire changing tool for mounting and demounting a tire will be set forth. First, the manner of mounting a tire with the "tool" will be described. The rim 12 is mounted on a mechanical tire changer 50. The mechanical tire changer may be of any conventional type or any other mounting stand may be used. The tire changer illustrated is made up of a base portion 41, adjustable arms 42, and an elongated upright cylindrical stem 43 mounted in a central portion of the top surface 44 of the base portion. The rim is laid flat on the base surface 44 such that the stem 43 extends upwardly through the rim mounting aperture 12a. Then the adjustable arms are extended outwardly and locked in position in a conventional manner such that they will hold the rim wheel firmly in place on said base. Next, a tire is positioned over the top surface of the wheel rim to be mounted on said wheel rim.

Although the lower bead 11a is shown mounted in position on rim wheel 12, the description will proceed with the tire partially mounted as shown in FIGURE 1 since the manner of mounting said tire is the same for mounting both the lower bead 11a and the upper bead 25, see FIGURE 2.

Before the bead is expanded such that it may be pushed downwardly below the rim flange 26, the tool is positioned such that the inwardly turned hook extends below and inwardly of the flange 26. The vertical leg will be at that time adjacent the outer peripheral edge of the rim flange 26.

At this time the flat plate 21 is above the peripheral edge of the rim wheel and is in position to be rotated around said flange. The handle 13 extends diagonally upward from the rim flange 26 and diametrically across the rim wheel. Thus the handle may be pivoted around the stem 43. At the same time the handle is of sufficient length, and height, so that the demounting end may be readily grasped by a party and rotated around said stem whereby the flat plate rides on or adjacent the upper peripheral edge of the flange.

When the rim mounting portion has been positioned as previously set forth, the bead 25 is positioned beneath the curved portion 29. As the tire tool is rotated around the flange the bead 25 will be pushed outwardly over the peripheral edge of the flange by the vertical sections 28, thus expanding the bead such that it may be fitted over the flange. Immediately after the beads have been expanded, it comes in contact with the lower surface of the inclined section 30 which pushes or forces the beads in a downward direction transversely across the flange. The bead having been passed beneath the peripheral edge of the flange, and out of contact with the tool, will contract and as a result will come into engagement with the vertical face of the rim 12a. Thus an outward force is exerted by the vertical section and a downward force is exerted by the inclined section on the bead, while at the same time sufficient leverage is obtained to exert the aforementioned forces by the provision of the long shaft 13 which is pivotally rotated about the stem 43.

The curved portion 29 extending outward from the outer edge of the vertical leg assures that the bead does not escape coming in contact with the lower surface of the inclined section. After the tool has been completely rotated around the stem 43 the bead of the tire has been forced outwardly from and transversely beneath the rim flange, thereby properly positioning the tire on a wheel rim. The other bead of the tire was similarly positioned in the manner set forth and therefore will not be further described.

It is to be noted that as bead engaging bar forces the bead radially outward from and transversely downward with respect to the rim flange, the bead bearing against said bar and the elements connected thereto will force the vertical leg against the vertical surface of the rim flange and the inward turned hook against the generally horizontal surface of said flange. Thus the rim engaging head is held in position to be slid around the peripheral edge of rim flange while at the same time due to the relatively wide width W of the head with respect to its height H, the rim engaging head is prevented from rotating about an axis lying in a plane perpendicular to the axis of the stem.

In order to demount a tire the opposite end of the tool is inserted between the bead and the rim flange. Then pressure is exerted on the mounting end of the shaft in order to force the tool into an inclined position similar to that for mounting the tire as shown in FIGURE 1. Assuming the plate 36 were inserted in the space 45, the surface 36b of the rectangular plate 14 would rest upon the peripheral edge of the rim flange while the bead would bear against the vertical surface of the knob 37. At this time the tire changing tool would be rotated about stem 43 to force the bead upward and outward over the flange. While the tool is thus rotated around the stem 43, the surface 36b would ride on the rim and would be held in that position by the downward pressure exerted thereon by the bead. At the same time the bead bearing against the knob 37 would prevent the tool from slipping into the tire. After the first bead has been demounted from the wheel rim, the aforementioned series of operations are repeated to demount the second bead from the rim to complete the demounting of the tire from the rim.

The structure and the manner of operation of my preferred embodiment having been set forth I will now proceed to describe the structure of the modified embodiment of my invention as shown in FIGURES 5 and 6. The structure of the modified embodiment is similar to that of the preferred embodiment except that the bead engaging bar is of a slightly different shape and has been provided with a rotating means on the vertical section 50 and a second rotating means on the inclined section 53. As may be noted in FIGURE 6, the vertical section forms an angle of approximately 90° with the plane passed through the longitudinal axis of the inclined section. The collar 56 is formed on the upper portion of the vertical section such that it will hold the outward forcing wheel 55 at an angle of approximately 90° to the bead that passes over the edges thereof. The outward forcing wheel is retained in position by the aforementioned collar 56 and a washer 57 which is held in place against the bottom edge of said wheel by a cotter pin 58. The wheel is an elongated cylinder such that the upper portion thereof extends above the horizontal plane of the flat plate and the bottom portion extends through the horizontal plane of the surface of the inward turned hook.

The bead engaging bar 50, except for the different angle of inclination of the vertical section is substantially of the same configuration as the bead engaging bar of the preferred embodiment. The bead engaging bar 50 is supported from the horizontal flat plate by an upwardly curved leading edge bracket 59 and a downwardly curved trailing edge bracket 60, said brackets being secured at their respective ends to the bead engaging bar and to the top surface of the flat plate by weld 61.

A horizontal shaft 63 is welded to the inclined section 53 slightly rearwardly of the bracket 60. This shaft extends outwardly from the inclined bar such that a wheel 64 may be rotatably mounted thereon. The wheel is held in position on the shaft on one side by a collar 67 formed integrally with the shaft and on the other side by a washer 65 and cotter pin 66 that is inserted through an aperture formed in the shaft. The peripheral portion of the wheel coming in contact with the bead forces said bead in a downward direction such that the top surface of the bead is below the rim flange.

The modified embodiment of this invention is used in the same manner described for the preferred embodiment. The main difference of operation is that when the bead is forced in an outward direction, it frictionally rotates the wheel 55 while at the same time said bead is forced outwardly from the flange of said wheel. After the bead has been forced in an outward direction, and as the tool is pivoted about stem 43 the bead comes into contact with the bead forcing wheel 64, said wheel rotating as it forces the bead in a downward direction to pass it transversely to the rim flange. A curved section 52 similarly as the preferred embodiment extends outwardly from the vertical section such that if there is any tendency for the bead to slip up and away from the wheel 55, said bead will be prevented from doing so as it will come into contact with the under surface of the curved section and be retained in position.

From the foregoing it may be seen that a tire changing tool has been described which has means for retaining one end thereof adjacent a rim flange, means which prevent the tool from rotating about its longitudinal axis as the tool is pivoted about a fixed object, means for forcing the bead radially outward beyond the wheel rim and additional means for forcing the bead in a transverse direction so that it will come into contact with the vertical surface of the rim after the bead has been forced in an outward direction.

It is to be understood that although a tire changing bar having a specific geometric configuration has been described there is no intent to limit the tire changing tool to said configuration. As long as the tool embodies the four previously mentioned means the exact geometric configuration of said parts is not to be considered as a limitation on my invention. Similarly even though the description has set forth using a mechanical tire changer as a mounting base it is to be understood that other bases or means could be utilized whereby the tool may be rotated about an upright pedestal.

As many apparent widely different embodiments may be made without departing from the spirit and scope thereof, it is to be understood that I do not limit myself to the specific embodiments herein.

What I claim is:

1. Apparatus for mounting and demounting a tire having a bead portion from a wheel having a rim flange, said apparatus comprising a tire mount and a hand tire changing tool, said tire mount including a base, an upright pivot mounted on said base, said pivot extending through a central portion of the rim when a rim is positioned on said base, adjustable arm means secured to the base for locking a rim in position on said base; and said tool having a hooked end that extends above and below the peripheral edge of the flange, an elongated handle connected to said hooked end, said handle extending generally diametrically across the rim when the hooked end is positioned on said flange for use, forcing means extending in front of the hooked end and above said hooked end for forcing the bead radially outward from the pivot and transversely with respect to the width of the rim to force the bead transversely across the rim flange, said forcing means including at least a curved bar having a generally vertical front section and inclined rear sections, each of said sections extending above and below the hooked end when said means is positioned on a rim mounted in a horizontal position.

2. Apparatus for mounting and demounting a tire having a bead portion from a wheel rim having a rim flange, said apparatus comprising an elongated shaft, means for forcing the bead portion of the tire transversely across the peripheral rim flange of said rim, and means mounted on the shaft for retaining one end of the shaft adjacent the rim flange and holding the forcing means in position to force said portion across the rim flange as the forcing means is rotated around the rim flange, said forcing means including an inclined bar of a length and an angle of inclination to extend in an axial direction outwardly from the rim flange and have one end extend axially inwardly of said rim flange whereby it extends across the rim flange and overlies the bead of the tire for forcing said bead across the rim flange, said bar being inclined from said one end outwardly and forwardly in the direction of movement of said forcing means.

3. The device of claim 2 further characterized in that the forcing means includes a portion that extends axially across the rim flange forwardly of the inclined bar to force the bead radially outward from the rim.

4. Apparatus for mounting and demounting a tire having a bead portion from a wheel rim having a rim flange, said apparatus comprising a tire mount and a hand tire changing tool, said tire mount including a base, an upright pivot mounted on said base, said pivot extending through a central portion of the rim when the rim is positioned on said base, adjustable arm means secured to the base for locking a rim in position on said base; and said tool having a hooked end that extends above and below the peripheral edge of the flange, an elongated handle connected to said hooked end, said handle extending generally diametrically across the rim when the hooked end is positioned on said flange for use, forcing means extending in front of the hooked end and above said hooked end for forcing the bead radially outwardly from the pivot and extending transversely with respect to the width of the rim to force the bead transversely across the rim flange when said hooked flange is positioned on said flange for use, said forcing means including an elongated cylindrical wheel rotatably mounted for forcing the bead radially outwardly from a wheel rim, the axis of said cylindrical wheel extending in the axial direction of the rim a distance to have one axial end of the wheel located above said rim flange and the other end below said rim flange.

5. A hand tool for mounting a tire on a wheel rim having a peripheral flange, said tool comprising an elongated shaft, rim engaging means for maintaining a tool on a rim as said rim engaging means is rotated about the rim, said rim engaging means mounted on the shaft, and forcing means for forcing the bead of a tire outwardly from the rim and transversely over the peripheral flange, said forcing means including an elongated transverse portion that protrudes radially outwardly from the rim and axially across the rim flange when the rim engaging means is positioned on the rim flange, said rim engaging means including a vertical leg that rides adjacent the width portion of the flange, the height of said leg being greater than the width of the flange, and a flat plate that rides on the rim generally perpendicular to the axis of the rim, said plate extending across a sufficient arc of the rim relative to the height of the vertical leg so that the rim engaging means is prevented from rotating about an axis lying in a plane that is perpendicular to the axis of the rim.

References Cited in the file of this patent

UNITED STATES PATENTS

| | | |
|---|---|---|
| 965,076 | Carle | July 19, 1910 |
| 1,938,940 | Smith | Dec. 12, 1933 |
| 2,421,856 | Teegarden | June 10, 1947 |
| 2,437,512 | Ekse | Mar. 9, 1948 |
| 2,482,789 | Moore | Sept. 27, 1949 |
| 2,505,172 | Coats | Apr. 25, 1950 |
| 2,556,024 | Bourdon et al. | June 5, 1951 |
| 2,845,969 | Duquesne | Aug. 5, 1958 |
| 2,888,064 | Coxworth | May 26, 1959 |

FOREIGN PATENTS

| | | |
|---|---|---|
| 386,437 | Germany | Dec. 8, 1923 |